United States Patent
Spariosu et al.

(10) Patent No.: US 7,324,568 B2
(45) Date of Patent: Jan. 29, 2008

(54) MODULATED SATURABLE ABSORBER CONTROLLED LASER

(75) Inventors: Kalin Spariosu, Thousand Oaks, CA (US); Milton Birnbaum, Rancho Palos Verdes, CA (US)

(73) Assignee: Raytheon Company, Waltham, MA (US)

( * ) Notice: Subject to any disclaimer, the term of this patent is extended or adjusted under 35 U.S.C. 154(b) by 186 days.

(21) Appl. No.: 10/820,613

(22) Filed: Apr. 8, 2004

(65) Prior Publication Data
US 2005/0226280 A1    Oct. 13, 2005

(51) Int. Cl.
*H01S 3/11* (2006.01)
(52) U.S. Cl. .......................... 372/10; 372/11
(58) Field of Classification Search .............. 372/11, 372/25, 18, 10, 39; 359/333
See application file for complete search history.

(56) References Cited

U.S. PATENT DOCUMENTS

| | | | |
|---|---|---|---|
| 4,860,296 A * | 8/1989 | Chemla et al. | 372/44.01 |
| 5,216,688 A | 6/1993 | Kortz et al. | |
| 5,408,480 A * | 4/1995 | Hemmati | 372/10 |
| 5,654,973 A | 8/1997 | Stultz et al. | |
| 5,867,305 A * | 2/1999 | Waarts et al. | 359/337.12 |
| 5,991,315 A * | 11/1999 | Injeyan et al. | 372/11 |
| 6,023,479 A * | 2/2000 | Thony et al. | 372/11 |
| 6,700,709 B1 * | 3/2004 | Fermann | 359/641 |
| 2002/0051470 A1 * | 5/2002 | Halmos et al. | 372/10 |
| 2002/0185474 A1 | 12/2002 | Dunsky et al. | |
| 2003/0160034 A1 | 8/2003 | Filgas et al. | |
| 2004/0066805 A1 * | 4/2004 | Afzal et al. | 372/10 |
| 2004/0190564 A1 * | 9/2004 | Zhou | 372/10 |
| 2005/0094678 A1 * | 5/2005 | Zou et al. | 372/12 |

FOREIGN PATENT DOCUMENTS

| | | |
|---|---|---|
| DE | 101-35-453 | 1/2003 |
| EP | 0-496-632 | 7/1992 |

OTHER PUBLICATIONS

K. Spariosu, R. D. Stultz, M. Birnbaum, T. H. Allik, and J. A. Hutchinson, Er:Ca5(PO4)3F Saturable Absorber Q Switch For The Er:Glass Laser At 1.53 mM, Appl. Phys. Lett. 62(22), 2763-2765 (1993).

(Continued)

*Primary Examiner*—Minsun Oh Harvey
*Assistant Examiner*—Tuan N. Nguyen
(74) *Attorney, Agent, or Firm*—Leonard A. Alkov

(57) ABSTRACT

A modulated saturable absorber controlled laser. The laser includes an active medium; a saturable absorber material operationally coupled to the medium to serve as a passive Q switch; and an energy source disposed external to the medium for apply energy to the absorber. In particular embodiments, the energy source is a diode laser and focusing optics are included between the diode laser and the absorber. Modulation of the gain at the photon round trip time in the laser resonator causes a mode-locked laser output. A dichroic beamsplitter is included in this embodiment for directing energy to the absorber. In an alternative embodiment, the diode laser is a quasi-monolithic diode laser assembly ring.

1 Claim, 4 Drawing Sheets

OTHER PUBLICATIONS

J. J. Degnan, Optimization Of Passively Q-Switched Lasers, IEEE J. Quantum Electron. 31(11), 1890-1901 (1995).

R. Haring et al., Passively Q-Switched microchip laser at 1.5 um, J. Opt. Soc. Am. B, 16 (12), 1805-1812, 2001.

K. Spariosu, R. D. Stultz, M. Birnbaum, T. H. Allik, and J. A. Hutchison, Er:Ca5(PO4)3F Saturable Absorber Q Switch For The Er:Glass Laser At 1.53 mM, Appl. Phys. Lett. 62(22), 2763-2765 (1993).

J. J. Degnan, Optimization Of Passively Q-Switched Lasers, IEEE J. Quantum Electron. 31(11), 1890-1901 (1995).

R. Haring et al., Passively Q-Switched microchip laser at 1.5 um, J. Opt. Soc. Am. B, 16 (12), 1805-1812, 2001.

* cited by examiner

Pulse timing-pump and fast diode SA activator

MODULATED SATURABLE ABSORBER CONTROLLED LASER

BACKGROUND OF THE INVENTION

1. Field of the Invention

The present invention relates to lasers. More specifically, the present invention relates to Q-switched and mode-locked lasers.

2. Description of the Related Art

There is an increasing need for compact active laser imaging sensors for detection and identification in battlefield environments and other applications. For these applications, a pulsed transmitter is used for flash ladar implementation as these devices offer high resolution for hidden and/or camouflaged target detection and identification. These applications require a laser source that is eye-safe (i.e. with a wavelength of 1400-1700 nm), with a short pulse width (i.e., less that 0.5 nanoseconds in duration) and high energy per pulse (i.e., 1-5 millijoules). Short pulse width lasers are needed to provide sufficient resolution to permit automatic target resolution. High energy per pulse is required to allow for standoff operation.

A laser is a device that emits a spatially coherent beam of light at a specific wavelength. In a laser, a lasing element is placed within a laser resonator cavity and pumped with an energy source such as a flash lamp. The pumping action produces stored energy and gain within the lasing element. When the gain exceeds the losses, so that there is a net light amplification per round trip of the light in the resonator cavity, laser light begins to build up in the cavity, and stored energy is extracted from the lasing element.

This energy can be released in the form of a very short, intense light pulse by using a device called a Q-switch. A laser can also operate in a mode-locked mode. A laser resonator of length L supports a number of modes separated by the inverse-round-trip time of the light field given by:

$$\Delta v = \frac{c}{2L} \quad [1]$$

where c is the speed of the light field in the laser cavity. The number of longitudinal modes that a laser can support is governed by the gain bandwidth of the laser gain medium, $\Delta\theta$. This gain bandwidth in common laser systems such as Nd:YAG is typically on the order of 100 GHz. Hence, cavity/resonator lengths of ~1 meter can support ~10³ modes. (Conversely, ultra-short resonators such as microchip lasers having resonator lengths of ~1 mm will typically operate in a single longitudinal mode regime).

In order to generate short pulses (on the order of a nanosecond or less), the laser will typically have a Q switch. A Q-switch can be an active device that is controlled or driven by an external signal. The Q-switch can also be a passive. structure that has no external control, but instead operates periodically as a result of its own properties. Passive Q-switches, when available, are usually the preferred method for obtaining Q-switched pulses because of their low cost, efficiency, reliability, simplicity, and other advantages.

A saturable absorber (SA)—or bleachable filter—can be used as a passive Q-switch. A saturable absorber is a material: solid (crystal, glass, polymer); or liquid (dye) having transmittance properties that vary as a function of the intensity of the incident light that falls upon this material.

When light of low intensity is incident upon the saturable absorber, its light transmittance is relatively low, resulting in high cavity losses. As the incident light energy increases, due to the buildup of energy within the laser resonator cavity, the light transmittance of the SA material increases. At some point, the light transmittance increases to a level such that the SA "bleaches", i.e., becomes transparent, so that the cavity losses become low, and an intense Q-switched light pulse is emitted.

To achieve short pulse widths, the SA must switch quickly to the transparent state. However, for fast operation, the absorption cross-section of the SA is required to be much much larger than the stimulated emission cross-section of the laser gain medium: $\sigma_{SA} \gg \sigma_{se}$. If this is not the case, Q-switch performance generally degrades and output pulse widths increase.

Unfortunately, the cross-section of conventional saturable absorbers is typically on the order of 10 times or less the cross-section of conventional laser gain mediums. Hence, shorter pulse widths have not heretofore been possible.

To compensate for this shortcoming, prior approaches have involved the use of high gain Neodymium microchip lasers. In this application, the output is typically converted to an eye safe range using an optical parametric amplifier. Unfortunately, Neodymium is a poor energy storage laser material and outputs pulses only on the order of micro-joules in energy.

Another approach involves the use of erbium-ytterbium glass lasers with short end pumped cavities to achieve the desired short pulse widths. However, erbium-ytterbium glass microchip lasers are characteristically low gain devices. In addition, the erbium-ytterbium transfer process required by these devices typically necessitates the use of an energy inefficient pumping scheme. Consequently, erbium-ytterbium lasers are also typically too limited with respect to energy output levels to be used for the more demanding current applications mentioned above.

Hence, a need remains in the art for a short pulse length, high energy eye-safe laser.

SUMMARY OF THE INVENTION

The need in the art is addressed by the laser of the present invention which includes an active medium, a material operationally coupled to the medium and having a transmittance property that varies in response to incident energy; and an arrangement disposed external to the medium for applying energy to the material.

In particular embodiments, the material is a saturable absorber, the energy source is a diode laser and focusing optics are included between the diode laser and the absorber. A dichroic beamsplitter is included in this embodiment for directing energy to the absorber. In an alternative embodiment, the diode laser is a quasi-monolithic diode laser assembly ring with a plurality of laser diodes distributed to provide an optimally distributed bleaching energy for the absorber.

Conventionally, to obtain larger Q-switched pulse energies while maintaining short pulse widths, a larger extraction volume and, therefore, a larger resonator length is required. However, as explained herein, the limited SA cross-section to the stimulated emission cross-section governs the pulse width that can be obtained from a given resonator length. Implementing a fast bleaching of the SA can, however, result in the SA Q-switch acting as a very fast shutter thus circumventing the limitation of its inherent absorption cross-section. The external switch can be a ~1500 nm diode source that can be pulsed with fast (sub-nanosecond) rise times. Telecom industry production of large bandwidth (multiple GHz range) ~1500 nm diodes should make this implementation readily achievable.

The external fast activated SA switch should provide the following advantages: 1) allow the implementation of a sufficiently high optical density (OD) saturable absorber (SA) so as to prevent pre-lasing while still facilitating efficient Q-switch pulse generation from an optimized cavity design (this means that the output coupler can be optimized for most efficient Q-switch generation without the concern of insufficient intra-cavity bleaching energy availability); 2) allow for a consistent Q-switch opening since the hold-off of the SA is sufficiently high so that it can only be switched off with the fast external pulsed diode; 3) allow for instantaneous switch opening which will result in minimized Q-switch pulse widths.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

As mentioned above, one important property of SA Q-switches is the absorption cross-section. For effective operation for the SA as a Q-switch, the absorption cross section of the SA is required to be much larger than the stimulated emission cross section of the laser gain material: $\sigma_{SA} \gg \sigma_{se}$. If this is not the case, Q-switch performance generally degrades and output pulse widths increase. In order to circumvent this shortcoming, one can implement a resonator design which supports dissimilar mode size in the SA and the gain medium. See *Er:Ca$_5$(PO$_4$)$_3$F Saturable Absorber Q Switch For The Er:Glass Laser At 1.53 µM*, published by K. Spariosu, R. D. Stultz, M. Birnbaum, T. H. Allik, and J. A. Hutchinson, in Appl. Phys. Lett. 62(22), 2763-2765 (1993). This is illustrated in FIG. 1 below.

Figure 1:
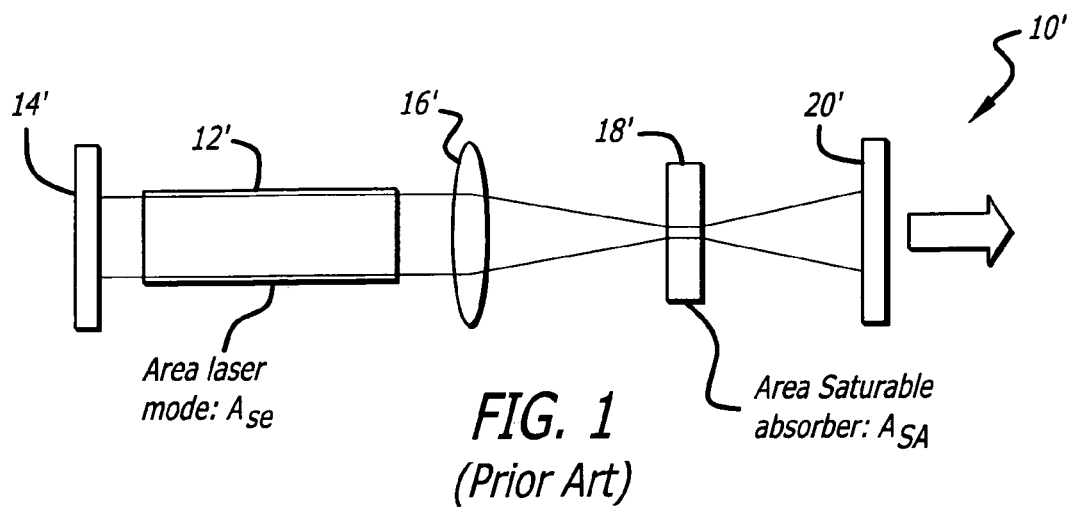
FIG. 1 is a diagram illustrating intra-cavity focusing using a saturable absorber to enhance used to enhance Q-switch performance in accordance with conventional teachings.

FIG. 1 is a diagram illustrating intra-cavity focusing using a saturable absorber to enhance used to enhance Q-switch performance in accordance with conventional teachings. In accordance with conventional teachings, the system 10' includes a laser gain medium 12' mounted between a high reflector 14' and an intra-cavity lens 16'. A saturable absorber Q switch 18' is positioned between the intra-cavity lens 16' and an outcoupler 20'.

The enhancement of the cross-section ratio in terms of the dissimilar mode area sizes is given by:

$$\frac{\sigma_{SA}}{A_{SA}} \gg \frac{\sigma_{se}}{A_{se}}. \quad [2]$$

where $\sigma_{SA}$ is the absorption cross-section of the absorber, $\sigma_{se}$, is the absorption cross-section of the laser mode, $A_{SA}$ is the area of the saturable absorber, and $A_{se}$ is the area of the laser mode.

Thus, in the case where the SA absorption cross-section is only ~2-3 times larger than the stimulated emission cross-section, implementing a ~3-5 times reduction in the intra-cavity SA mode area (with respect to the laser mode) ensures, that the above condition is met.

Although, this configuration can readily be implemented in standard laser cavities, this becomes very difficult—if not impossible—to implement in a microchip laser without significantly increasing the cavity length. In *Optimization Of Passively Q-Switched Lasers*, IEEE J. Quantum Electron. 31(11), 1890-1901 (1995), J. J. Degnan points out that a large effective SA absorption cross-section to the laser stimulated emission cross-section ratio of $\geq 10$ is needed for very short pulse Q-switch generation. However, due to the requirements that the cavity be very short, intra-cavity focusing is not feasible.

The present teachings address this problem by teaching the use of a fast pulse (much shorter than the Q-switch pulse) external light source operating at a wavelength close to the laser wavelength in order to effect instantaneous bleaching/opening of the SA Q-switch. This is illustrated in FIG. 2 below.

Figure 2:
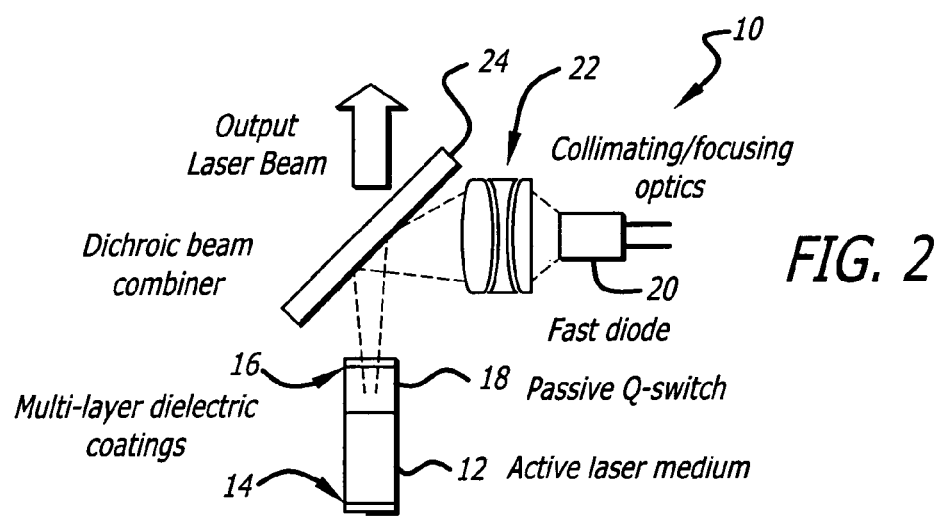
FIG. 2 is a diagram showing a laser with an optically driven SA Q-switch control via a fast external diode laser in accordance with an illustrative implementation of the teachings of the present invention.

FIG. 2 is a diagram showing a laser with an optically driven SA Q-switch control via a fast external diode laser in accordance with an illustrative implementation of the teachings of the present invention. As shown in FIG. 2, the system 10 includes an active laser medium 12 with first and second multi-layer dielectric coatings 14 and 16, respectively. A saturable absorber passive Q switch 18 is disposed within the laser cavity. In accordance with the present teachings, a fast pulse of energy (much shorter than the Q-switch pulse) is supplied by a fast diode 20 operating at a wavelength required to bleach the SA. The light is applied to the absorber 18 via collimating focusing optics 22 and a dichroic beam combiner 24 in order to effect an almost instantaneous bleaching/opening of the SA Q-switch.

After the pump source produces the specified inversion in the laser medium, the SA Q-switch should be energized by optical energy (light) from the fast diode laser. The diode laser should deliver the optical pulse of duration shorter or equal to the round trip time of light in the laser resonator and be of sufficient energy to produce appreciable bleaching of the SA Q-switch. Since the bulk of the bleaching could be the result of intra-cavity photon build-up, the fast diode pulse energy should only need to be a small fraction of the total required pulse energy to bleach the SA. If appreciable energy is required to operate the SA, it could be desirable to obtain a larger fraction of the SA bleaching energy from the pump diode lasers provided there is significant absorption in the SA at that wavelength. (For example, most resonantly pumped Er lasers utilize SA Q-switches with broad absorption bands that overlap the ~1500 nm pump wavelength.)

Figure 3:
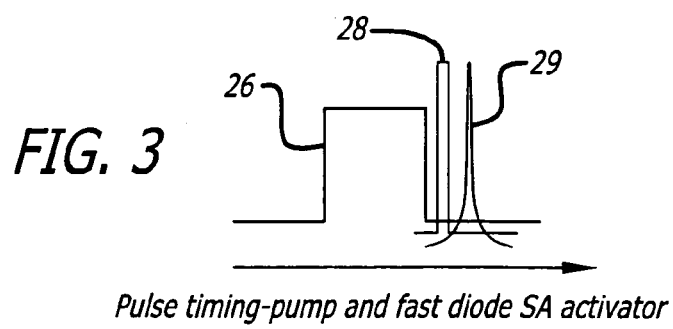
FIG. 3 is a timing diagram illustrative of an operation of the laser of FIG. 2 in accordance with the present teachings.
Figure 4:
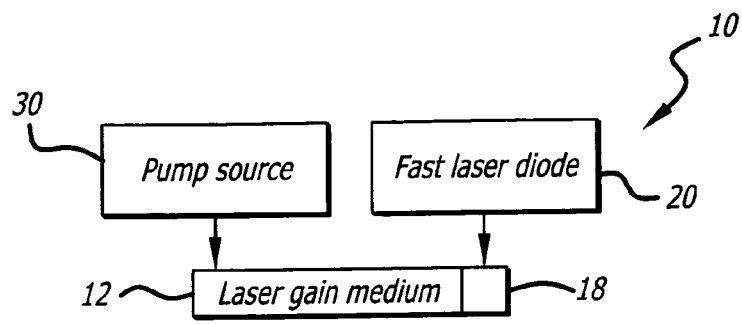
FIG. 4 is a block diagram of the laser of FIG. 2.

This is illustrated in FIG. 3. FIG. 3 is a timing diagram illustrative of an operation of the laser of FIG. 2 in accordance with the present teachings. FIG. 4 is a block diagram of the laser of FIG. 2. In FIGS. 3 and 4, a pump pulse 26, supplied by a pump source 30 is followed by a pulse 28 from the fast laser diode 20. The pulse 28 bleaches the SA 18 and causes the gain medium 12 to provide a Q switched output pulse 29.

Hence, the fast laser diode 20 serves as a switch which acts as the fast cavity dump shutter with a relatively low energy per pulse. A laser pulse much larger in duration can be utilized to provide this fast shutter effect as long as its rising edge is sufficiently fast (less than the cavity round trip time of photons). Currently available large bandwidth telecom 1500 nm diode lasers should be able to produce pulses with both the required lifetimes and short durations (so as to not waste photons after the Q-switch has been activated). Such laser diodes may be purchased from a variety of telecom manufacturers.

The design of the SA should be such that it has a sufficient OD (optical density) to hold off complete bleaching by the laser photon build up (and, hence, prevent lasing), such that it will only be completely bleached by the last incremental fast diode pulse emission.

The external switch diode can be implemented without necessarily increasing the real estate of the laser in the length direction. That is, the diodes can be staggered in a side-pumped configuration targeted to access only the SA material in a radial direction—perpendicular to the optic axis. This is illustrated in FIG. 5 below.

Figure 5:
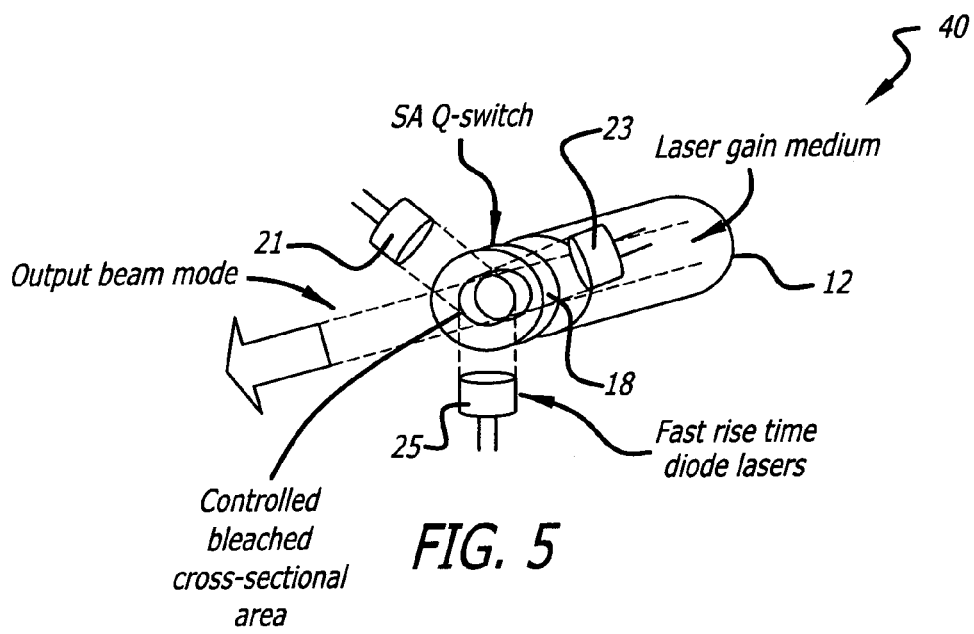
FIG. 5 is a simplified perspective view of an embodiment that illustrates optical activation of the SA Q-switch with tailored mode-matched bleaching profile implementation.
Figure 6:
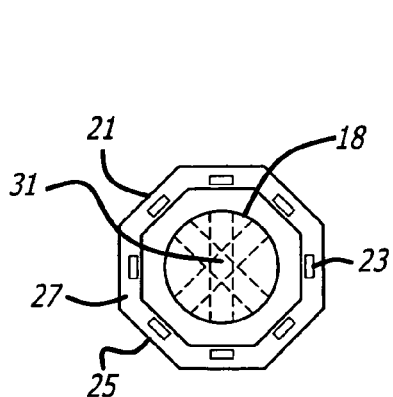
FIG. 6 is an end view of the embodiment of FIG. 5.
Figure 7:
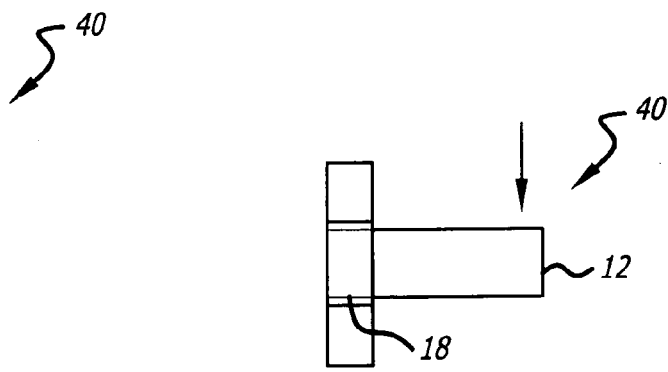
FIG. 7 is a simplified side view of the embodiment of FIG. 5.

FIG. 5 is a simplified perspective view of an embodiment that illustrates optical activation of the SA Q-switch with tailored mode-matched bleaching profile implementation. FIG. 6 is an end view of the embodiment of FIG. 5. FIG. 7 is a simplified side view of the embodiment of FIG. 5. In the system 40 of FIGS. 5-7, multiple (e.g. 10-100 or more) fast rise time diode lasers such as vertical cavity emitting lasers (VCELS) (of which three 21, 23 and 25 are shown in FIG. 5 and eight are shown in FIG. 6) are radially positioned uniformly about the periphery of a saturable absorber 18 disposed at the end of a laser gain medium 12. The diode lasers are secured within a quasi-monolithic diode laser assembly ring 27. This multiple diode laser design facilitates optimal mode matching and energy efficiency.

A clear advantage of the external pumped SA method of the present invention is the implementation of robust mode matching to the laser mode such that SA Q-switched efficiency can be improved dramatically. One common shortcoming of conventional SA Q-switches is an aperturing effect where a good portion of usable energy never makes out of the resonator due to unequal bleaching of the SA in the transverse dimension. That is, the intensity profile of the laser mode is such that the wings have lower intensity values than the center portion of the beam. The lower intensity is not sufficient to bleach the SA thus resulting in reduced conversion efficiency. This can easily circumvented by tailoring the bleached SA area as shown at 31 in FIG. 6.

Those skilled in the art will appreciate that the present invention is not limited to Erbium based lasers, but can be implemented at virtually any wavelength provided there are suitable saturable absorbers and laser diodes.

Mode-locked operation of a CW (or long pulse) laser is essential for vibrometry functions. Although active mode-lockers exist, this inventive technique can be applied to obtain mode-locked operation of the laser. Application of this invention can provide mode-locked operation over wavelength bands where such operation is very difficult or not feasible by conventional means.

Figure 8:
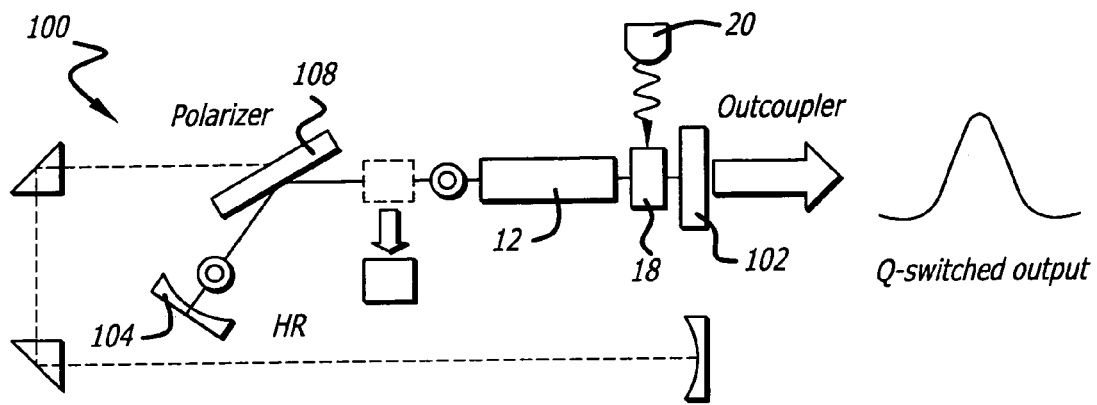
FIG. 8 is a schematic diagram of an illustrative dual-mode implementation of a laser system configured to provide a Q switched output pulse in accordance with the teachings of the present invention.

FIG. 8 is a schematic diagram of an illustrative dual-mode implementation of a laser system configured to provide a Q switched output pulse in accordance with the teachings of the present invention. In this configuration, cavity length is determined by the distance between the outcoupler 102 and a highly reflective mirror 104. In this mode, the active medium is pumped and the SA Q switch 18 is activated by the laser diode 20 in the manner set forth above. In the illustrative embodiment, the laser is an Erbium YAG laser.

Figure 9:
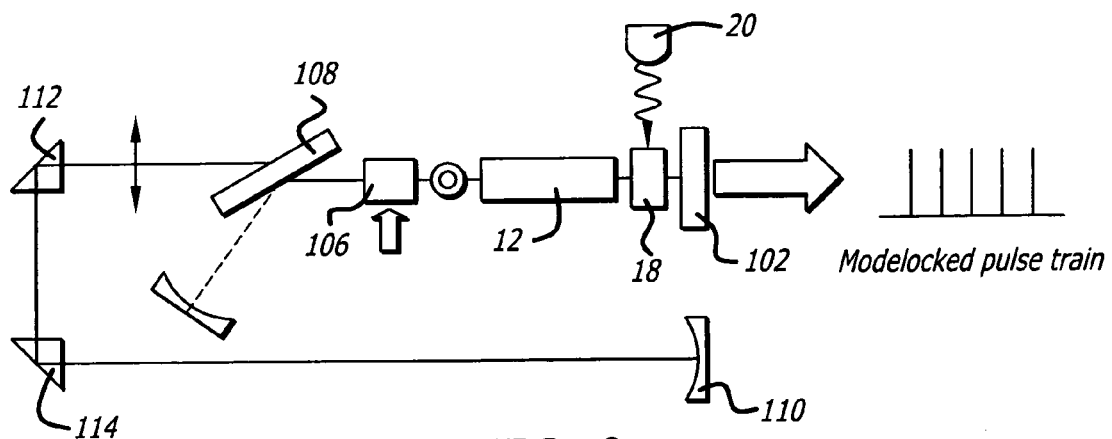
FIG. 9 is a schematic diagram of the illustrative dual-mode implementation of a laser system of FIG. 8 configured to output a mode-locked pulse train in accordance with the teachings of the present invention.

FIG. 9 is a schematic diagram of the illustrative dual-mode implementation of a laser system of FIG. 8 configured to output a mode-locked pulse train in accordance with the teachings of the present invention. To output a mode-locked pulse train, a 90° rotator 106 is switched into the optical path of the beam from the active medium 12. This changes the polarization of the beam and allows it to pass through a polarizer 108 to a second highly reflective end mirror 110 via fold mirrors 112 and 114. In this configuration, the cavity is much longer and the laser diode is modulated at a high speed to output a mode-locked pulse train as illustrated in FIG. 9. The configuration of FIG. 9 contemplates that the diodes are modulated at high speed (e.g. on the order of tens of gigahertz). To achieve mode-locked operation, the modulation frequency is required to be close to that computed from the photon roundtip time in the laser resonator.

The inherent simplicity and robustness of this multi-function laser implementation stems from the capability of implementing the mode-locking functionality as well as Q-switching in the same SA material. In a typical resonator of say 1 m in length, the longitudinal mode spacing is on the order of a few GHz—which is certainly within the modulation bandwidth capability of conventional telecom ~1500 nm diode lasers.

Figure 10:
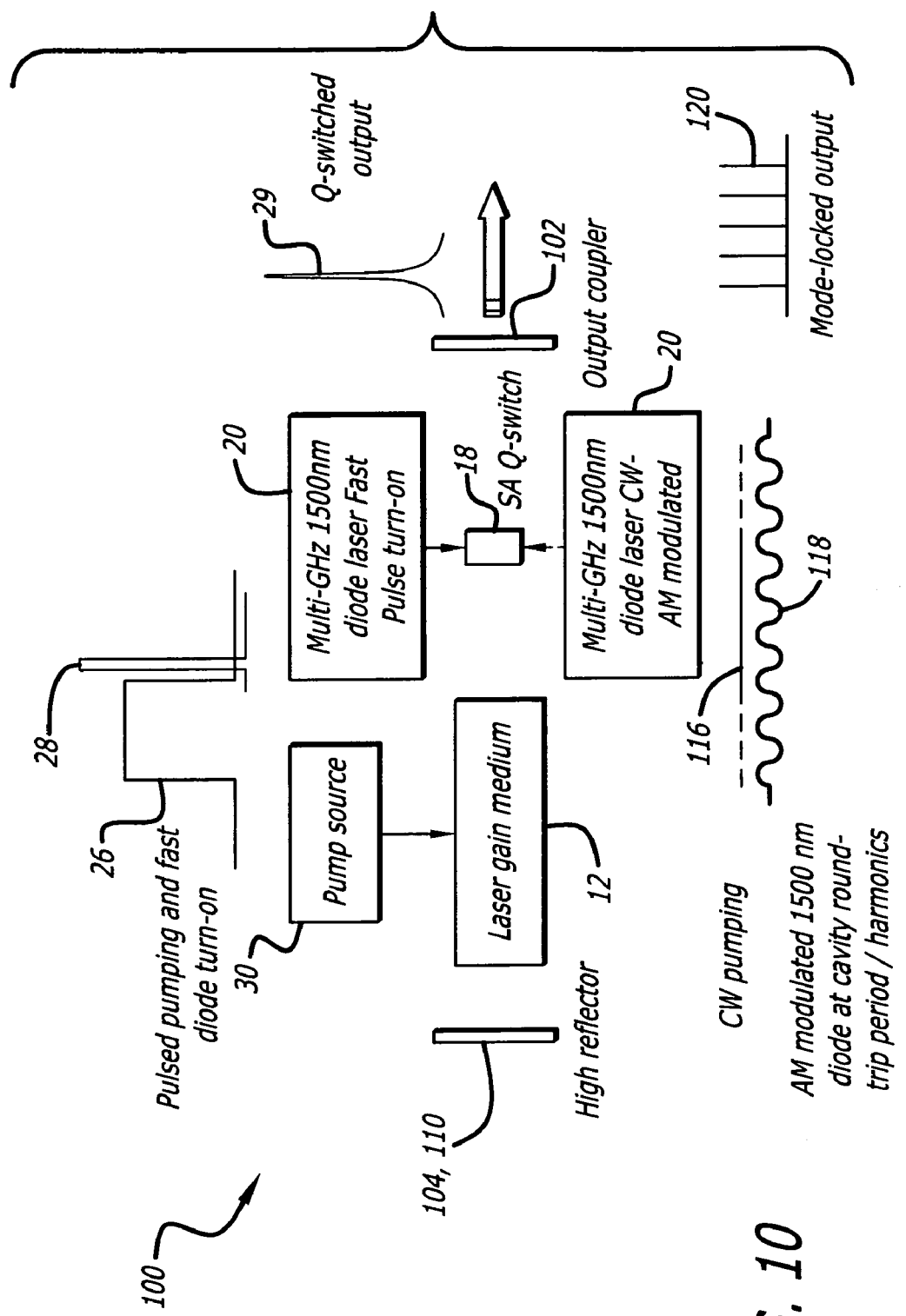
FIG. 10 is a timing diagram illustrative of an operation of the dual mode laser of FIGS. 8 and 9 in accordance with the-present teachings.

FIG. 10 is a timing diagram illustrative of an operation of the dual mode laser of FIGS. 8 and 9 in accordance with the present teachings. As shown in FIG. 10, when the system is configured in Q switched mode, a pump source 30 supplies a pump pulse 26 and then the laser diode 20 is energized with a pulse 28. The laser diode subsequently illuminates the saturable absorber 18 causing it to bleach and Q switch the medium 12. The resulting output of the laser 100 is a beam having the Q switched Gaussian distribution 29 shown in the figure. In mode-locked mode, the laser diode is activated with a modulated wave 118 that modulates the laser gain at the mode-locking frequency. The modulated OD of the SA enables a Q-switching mode-locked output to be obtained. This causes the SA to bleach and switch the medium so that it outputs a mode-locked pulse train 120.

Thus, the implementation of a dual mode, multi-function transmitter for ladar applications can be implemented by simply changing the waveform input to the diode laser modulator, since both Q-switched and mode-locked operation is obtained from the same SA. Cavity switch functions, are of course, achieved in a standard way with a flip-in optical element. This provides for an extremely robust laser transmitter for a variety of missions requiring small size/weight envelopes and low power/voltage restrictions.

Thus, the present invention has been described:herein with reference to a particular embodiment for a particular application. This invention should provide significant operational improvements for any SA that can be switched via a fast external diode light source. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,
What is claimed is:

1. A dual mode laser comprising:
   an outcoupler;
   a first highly reflective mirror;
   a second highly reflective mirror;
   an active medium disposed within a resonator cavity defined by said outcoupler and said first mirror in a first mode of operation and second mirror in a second mode of operation;
   a polarizer disposed in operational alignment with said outcoupler and said first and second mirrors;
   a polarization rotator for changing the polarization of a beam reflected by said outcoupler;
   a saturable absorber operationally coupled to said medium and having a transmittance property that varies in response to incident energy; and
   a laser diode disposed external to said medium for applying energy to said material with a pulse having a duration that is shorter than a round trip delay time of light within said resonator in said first mode of operation and with a series of pulses at a mode-locking frequency in said second mode of operation.

* * * * *